Jan. 19, 1965     M. H. GROVE     3,166,291
VALVE CONSTRUCTION AND METHOD
Filed April 25, 1962     4 Sheets-Sheet 1
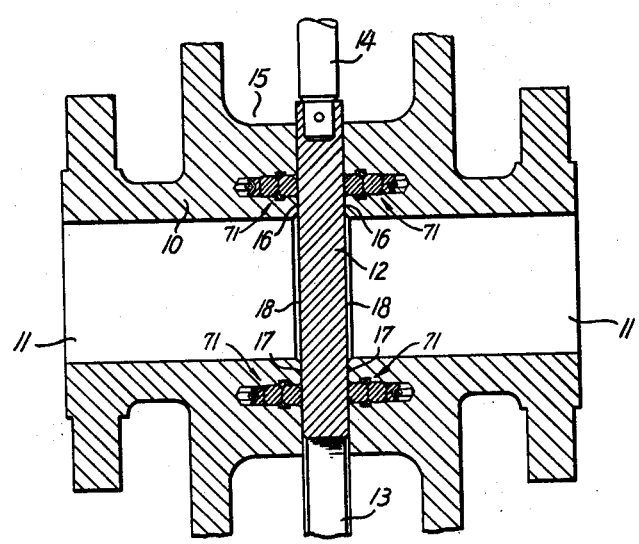
FIG_1_
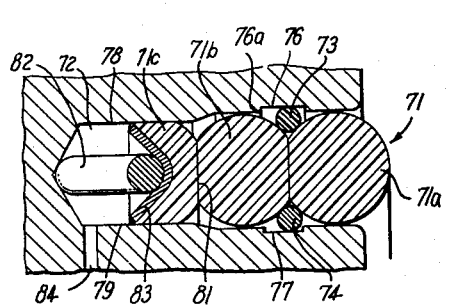
FIG_2_
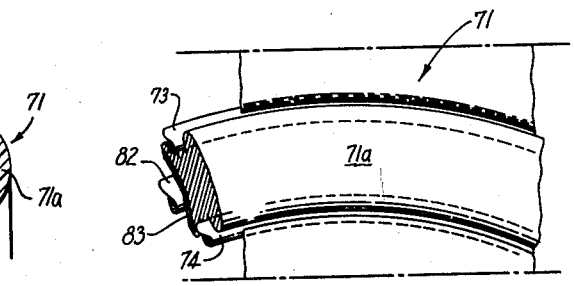
FIG_3_
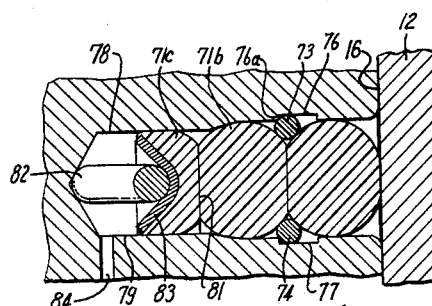
FIG_4_
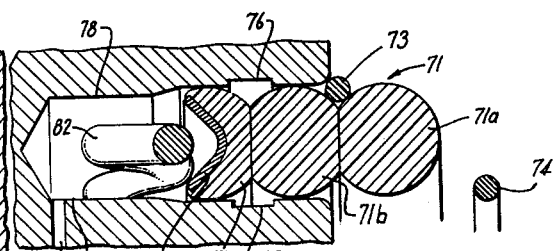
FIG_5_
INVENTOR.
Marvin H. Grove
BY
Attorneys Jan. 19, 1965 M. H. GROVE 3,166,291
VALVE CONSTRUCTION AND METHOD
Filed April 25, 1962 4 Sheets-Sheet 2
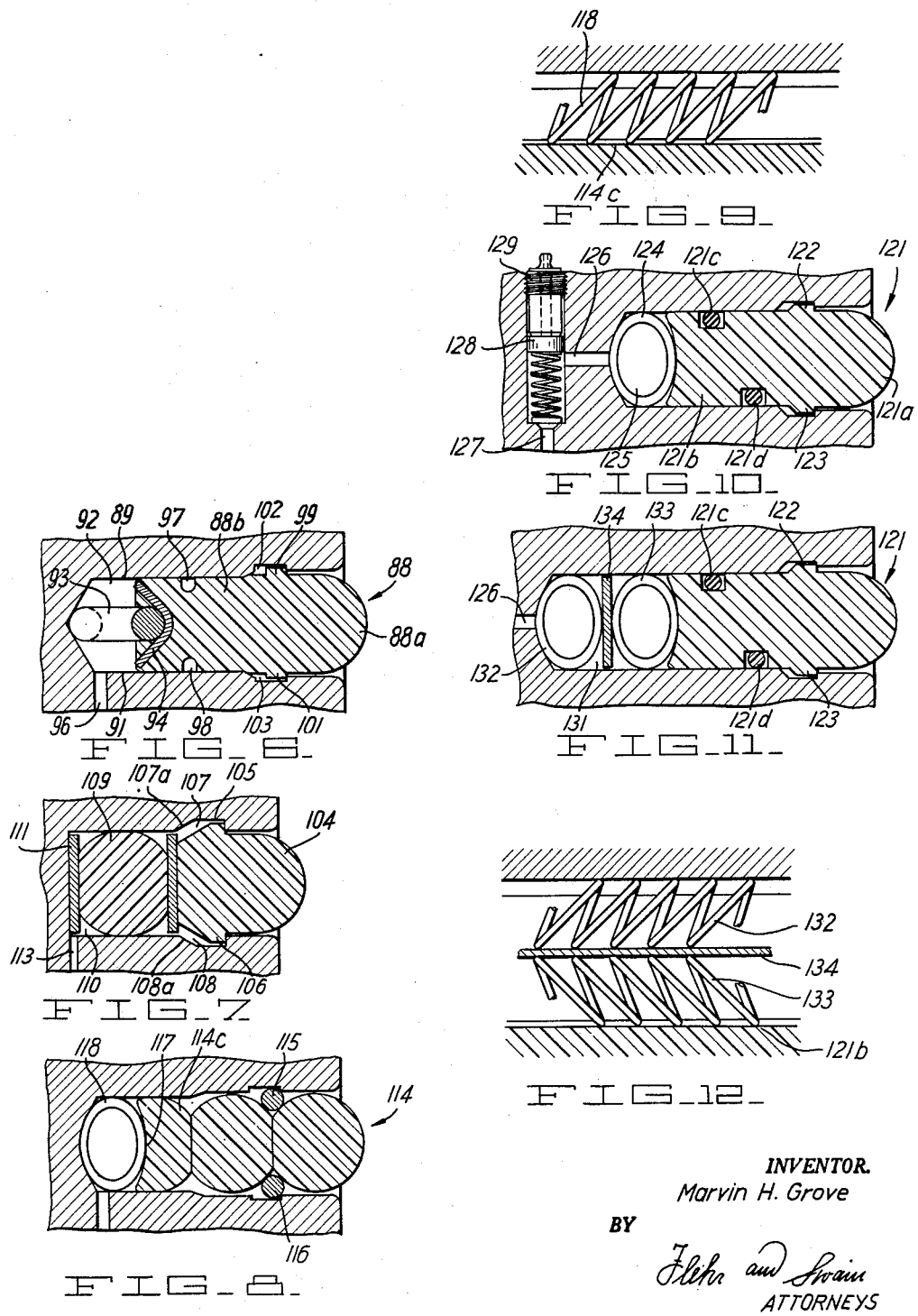
INVENTOR.
Marvin H. Grove
BY
Flehr and Swain
ATTORNEYS Jan. 19, 1965 M. H. GROVE 3,166,291
VALVE CONSTRUCTION AND METHOD
Filed April 25, 1962 4 Sheets-Sheet 3
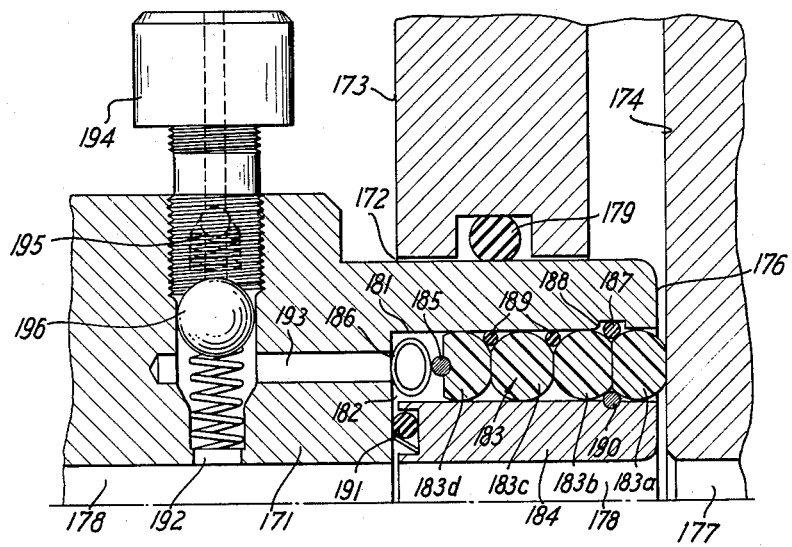
FIG_16_
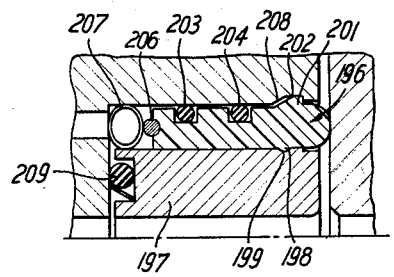
FIG_17_
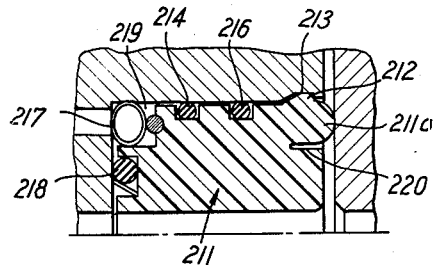
FIG_18_
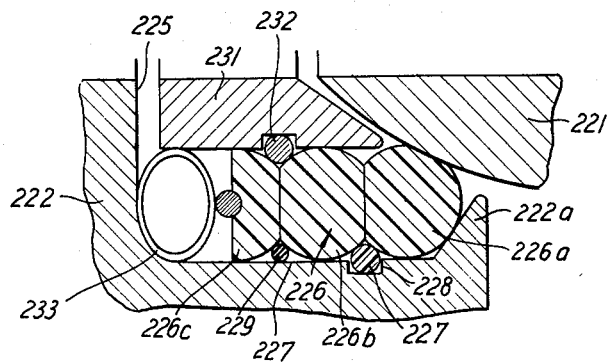
FIG_19_
INVENTOR.
Marvin H. Grove
BY
ATTORNEYS

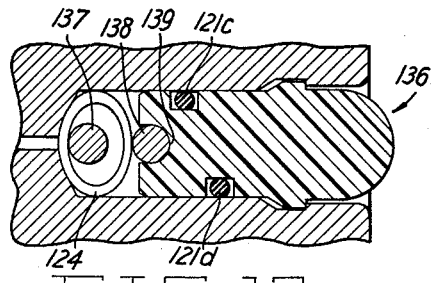
FIG_13.
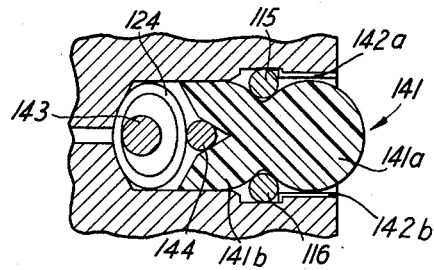
FIG_14.
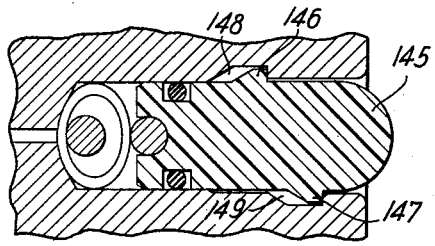
FIG_15.

United States Patent Office 3,166,291
Patented Jan. 19, 1965

3,166,291
VALVE CONSTRUCTION AND METHOD
Marvin H. Grove, Piedmont, Calif., assignor to M & J Engineering Co., Houston, Tex., a partnership
Filed Apr. 25, 1962, Ser. No. 190,174
8 Claims. (Cl. 251—172)

This invention relates generally to valves such as are employed for controlling fluid flow, to sealing means for use in such valves, and to methods for manufacturing the same.

In the construction of fluid flow control valves, it has been common to employ seals formed of various resilient materials such as synthetic rubber, Teflon or nylon. Simple insert seal rings mounted on either the body or the valve members are effective in some instances, but in general do not provide the desired degree of accommodation for valves made in the larger sizes, or where the cooperating valve working surfaces may not be true. In general such insert seals are mounted in a permanent fashion, as by pressing or molding into a retaining recess. Some resilient seal rings, particularly in the form of O-rings, have been loosely retained, but the mounting means employed (e.g. spring pressed seat rings) have been such as to add considerably to cost of manufacture. For many services it is desirable to use durable materials like nylon, which generally are considerably harder than materials like synthetic rubber. In the past, sealing members made of nylon or like hard materials have had limited application, because their range of accommodation has been quite limited, and because the mounting means employed for such sealing members has been subject to certain disadvantages.

It is a general object of the present invention to provide a novel valve construction having improved sealing means utilizing members formed of resilient material.

Another object of the invention is to provide a valve of the above character having sealing means formed of relatively hard resilient material, like nylon, but which is characterized by adequate accommodation to compensate for mechanical inaccuracies.

Another object of the invention is to provide a novel seal ring assembly including spring means and fluid pressure means for urging the seal ring against a cooperating valve member.

Another object of the invention is to provide a valve construction having novel means for mounting and retaining sealing members made of resilient material.

Additional objects and features of the invention will appear from the following description in which the preferred embodiments have been set forth in detail in conjunction with the accompanying drawing.

Referring to the drawing:

FIGURE 1 is a side elevational view, in section, illustrating the main parts of a simple gate valve incorporating the present invention.

FIGURE 2 is an enlarged cross-sectional detail illustrating the sealing means incorporated in the valve of FIGURE 1.

FIGURE 3 is a detail looking toward the right-hand side of FIGURE 2.

FIGURE 4 is a detail in section like FIGURE 2, but showing compression of the sealing means by engagement with the valve gate.

FIGURE 5 is an exploded detail in section illustrating the manner in which the sealing means is assembled within its accommodating recess.

FIGURE 6 is a detail like FIGURE 2, but showing another embodiment which likewise incorporates spring means and fluid pressure operated means.

FIGURE 7 is another detail like FIGURE 2 but showing an embodiment in which an O-ring is employed to serve the functions of spring means and piston means.

FIGURE 8 is another detail like FIGURE 2 showing another embodiment which incorporates a different type of spring means with fluid pressure operated means.

FIGURE 9 is a detail in section showing the spring means of FIGURE 8.

FIGURE 10 is a detail like FIGURE 2 showing another embodiment which employs check valve means.

FIGURE 11 is a detail like FIGURE 10 showing another embodiment using dual spring elements.

FIGURE 12 is a detail in section showing the dual spring means of FIGURE 10.

FIGURE 13 is an enlarged detail in section illustrating a sealing assembly somewhat similar to FIGURE 10, but utilizing means to prevent crushing of the spring.

FIGURE 14 is a detail in section similar to FIGURE 13, but showing separate snap-in means for retaining the seal ring.

FIGURE 15 is an enlarged cross sectional detail illustrating another sealing assembly embodiment, in which the snap-in means are located at different distances from the ends of the seal ring.

FIGURE 16 is an enlarged detail in section illustrating another type of sealing assembly which incorporates a rigid follower ring.

FIGURE 17 is another embodiment of a sealing assembly incorporating a follower ring.

FIGURE 18 is a detail in section illustrating another assembly utilizing a follower ring, but in which the sealing member and the follower ring are formed integral.

FIGURE 19 is a detail in section showing another sealing assembly particularly adapted for use in valves of the ball type.

In the drawing, the invention has been illustrated in conjunction with a valve of the gate type. However, it is to be understood that the invention can be incorporated in other types of valves, such as valves of the plug, ball or butterfly types.

The valve illustrated in FIGURE 1 consists of a body 10 having flow passages 11, and a valve gate 12. The gate in this instance is of the through-port type, being provided with the port 13 adapted to register with passages 11 for full open position of the valve. However, in other instances a plain gate may be employed. The gate is attached by stem 14 to suitable operating means (not shown) such as hand-operated gearing, a motor operator, or the like. Normally the body space 15 occupied by the gate 12 is sealed with respect to the atmosphere. Also the stem 14 extends through a bonnet (not shown) which is carried by the body, and which has stem sealing means. The annular portion 16 of the body are machined whereby their opposed parallel faces 17 normally are in close opposition to the side surfaces or valve working surfaces 18 of the gate.

The seal means incorporated in FIGURE 1, and shown in FIGURES 2–5, is characterized by the use of a sleeve-like seal ring made of suitable resilient material, like nylon. Snap-in means is provided to retain this ring within an accommodating recess within the body. When the valve is in operation, the seal ring presents a pressure area to upstream line pressure. On both the upstream and downstream sides, the seal ring is urged by spring means against the valve working surface of the gate.

Thus referring to FIGURES 2–5, the seal ring 71 can be made of a material like nylon with the two portions 71a and 71b cemented together or made integral. These portions can be made of solid rods of nylon or like hard resilient material, bent to a circle corresponding to the mean diameter of the recess 72, and with their ends cemented or otherwise bonded together. Two such circular members can be flattened on their sides and then cemented together to form the complete seal ring. This form of construction provides outer and inner peripheral recesses serving to accommodate the snap-in rings 73 and 74. The accommodating recess 73 in the valve body has outer and inner peripheral surfaces that are generally cylindrical. The outer and inner peripheral grooves or recesses 76 and 77 are provided, within which the snap-in rings 73 and 74 engage. Ring 73 can be made of material like nylon whereby it provides a seal between portion 71a and the body when portion 71a is forced inwardly (as on the downstream side of the valve) to squeeze this ring between portion 71a and the body shoulder 76a. The seal ring in this instance also includes an additional portion 71c which either is made integral with portions 71a and 71b, or permanently cemented thereto on the junction line 81. Portion 71c can be chevron or V-shaped in section as illustrated, and has a fluid-tight fit between the surfaces 78 and 79.

The lock-in or retaining member 74 may be in the form of a split spring snap-in ring, made of a suitable material such as a non-corrodible spring metal.

At the bottom of the recess 72 there is a spring 82 which can be in the form of a zigzag-shaped spring wire. This spring wire rests upon an annulus 83 which is V-shaped in section, and which in turn is fitted on one side of the seal portion 71c. A duct 84 is provided whereby the bottom portion of recess 72 is placed in communication with the associated body flow passage of the valve.

By reference to FIGURE 2 it will be seen that the dimensions and clearances are such that normally portion 71a projects somewhat beyond the plane of the body surface 17. When the valve is assembled, the entire sealing assembly is somewhat compressed on both the upstream and downstream sides. FIGURE 4 represents engagement of the seal ring 71 with the gate, whereby it is forced inwardly of the recess 72 a certain amount, against the give of the spring 82. The pressure thus provided by the spring 82 affords spring loading for establishing an initial seal between each seal ring 71 and the adjacent surface of the valve gate.

It will be evident that the sealing assembly described above affords a substantial amount of accommodation, having reference particularly to accommodation for inaccuracies and variations in dimensions during manufacture, and accommodation to maintain sealing contact between the seal ring and the gate for lateral movements of the gate in response to reversal of applied line pressure.

The spaces 86 and 87 may be factory filled with a suitable semifluid lubricant at the time of assembly. Line pressure cannot leak past the seal ring, because of the sealing fit between portion 71b and the peripheral surfaces 78 and 79. Considering that such an assembly is on the upstream side of a valve, line pressure is applied through the duct 84 to the portion 71c whereby this portion functions as a piston to urge the entire sealing assembly toward the gate.

The construction described above facilitates assembly at the time of manufacture, and disassembly for making repairs. Exploded FIGURE 5 illustrates how the separate parts appear. To assemble the valve, the sealing member is positioned within the recess 72, together with the spring 84. Thereafter the rings 73 and 74 are positioned within their accommodating recesses. When it is desired to replace a sealing member, it can be removed in mutilated condition and then the snap-in rings removed.

The assembly shown in FIGURE 6 likewise incorporates both spring means and fluid pressure operated means. Thus, the seal ring 88 in this instance may be made of a material like synthetic rubber and its exterior portion 88a is rounded to establish sealing contact with the valve working surface of an associated valve member, such as a valve gate. The inner portion 88b of the seal ring is dimensioned to have a fluid tight seal between the outer and inner peripheral defining surfaces 89 and 91, of the body recess 92.

Spring 93, which is in the form of a zig-zag wire, engages the seating annulus 94, to urge the seal outwardly against the cooperating valve member. Fluid pressure acting through the duct 96 also serves to yieldably urge the seal outwardly and independent of the force exerted by the spring. The outer and inner spaces 97 and 98 may be filled with a semi-viscous lubricant or grease.

The seal member in this instance, is retained within the body recess by the integral ribs 99 and 101, engaging within the body recesses 102 and 103.

In this embodiment of FIGURE 7 the seal ring 104 is made of suitable resilient material, and has integral ribs 105 and 106, for interlocking with the body recesses 107 and 108. A resilient ring 109 of the O ring type is fitted into the recess 110 and is compressed between the inserted annuluses or washers 111, 112. Duct 113 connects with the corresponding flow passage of the valve body. With the sealing assembly just described the O ring 109 functions both as a fluid pressure operated piston, and as spring means for yieldably urging the seal ring 104 in an outward direction. Ribs 105 and 106 are snapped into place when the seal member 104 is assembled into the recess 110. On the downstream side they are pressed against the surfaces 107a, 108a.

The assembly shown in FIGURE 8 incorporates spring means of the coiled wire type. In this instance the seal ring 114 is retained by the snap-in rings 115 and 116 substantially the same as in FIGURE 2. The portion 114c corresponding to the portion 71c of FIGURE 2, has a cup shaped inner end face 117, which serves to seat one side of the coiled wire spring 118. When the spring is first introduced into the body recess 119, it is in the form of a spring wire coiled helicoidly, with each convolution substantially in a plane at right angles to the axis of the helix. However, when the seal ring 114 is installed together with the snap-in rings 115 and 116, the seal ring is rotated a small amount about the axis of the body passage, while the surface 117 contacts the spring 118, and as the seal ring is being moved into its final position with the snap-in rings 115 and 116 engaging within the body. Such movement tends to bend the convolutions sideways so that they are in plane inclined to the axis of the helix, as shown in FIGURE 9.

In a typical assembly the plane of each convolution may be inclined at an angle of the order of say 40° to the axis of the helix, and with further compression this angle may increase to say 60° or more. The recess bottom 119 may conform in curvature to the curvature of the inclined convolutions.

If desired, instead of using a helical spring coil which has its convolutions inclined during assembly, the spring can be formed by winding the wire with convolutions that normally are inclined. Also instead of winding the wire in circular convolutions, it may be wound in convolutions that are square or generally rectangular.

In the embodiment of FIGURE 10 the sealing member 121 is somewhat similar in form to the seal member 88 of FIGURE 16. The rounded portion 121a forms sealing contact with the valve working surface of the associated valve member, and the portion 121b forms a fluid piston. In this instance portion 121b is more loosely fitted and it is grooved to accommodate the resilient seal rings 121c and 121d, which may be of synthetic rubber. Integral ribs 122 and 123 serve to lock the seal ring in place. The spring 124 is similar to the spring 118 described with reference to FIGURES 18 and 19. Instead of a simple duct connecting the recess 125 with the corresponding body fluid passage of the valve, this recess makes communication through ducts 126 and 127. The small valve member 128 is spring urged toward and seats upon the inner end of fitting 129. A fluid or gas under pressure can be applied to fitting 129, such as a lubricating or sealing grease or plastic. Sufficient air pressure can be applied to dislodge the sealing assembly and hereby facilitate repairs or replacements.

The embodiment shown in FIGURE 11 is similar to FIGURE 20, except that dual springs are employed. Thus the body recess 131 is made somewhat deeper, to accommodate the two springs 132 and 133, which are separated by the annulus 134. Preferably the convolutions are oppositely inclined as shown in FIGURE 22. With this type of spring means a greater range of deflection is possible. Also deflection takes place without rubbing of the springs against adjacent contacting surfaces.

In the embodiment of FIGURE 13 the resilient seal ring 136 is similar in form to the seal ring 121 of FIGURE 10. The spring 124 is the same as in FIGURE 10. A circular rod or wire 137 is threaded through the spring 124 and serves to limit deflection of the inclined convolutions. An additional circular rod or wire 138 is seated within a groove 139 formed in the seal ring 136, to provide a metal surface for contacting the convolutions of spring 124.

With the embodiment of FIGURE 13, inward deflection of spring 12 is limited by member 137. Such a limitation is desirable in that it prevents excessive deflection such as might cause crushing or permanent deformation.

In the embodiment of FIGURE 14 the seal ring 141 is held in place by the snap-in rings 115 and 116. Ring 115 or both rings 115 and 116, can be made of nylon or like hard non-metallic material. Rings 115 and 116 may be more readily inserted or removed by employing the removable split metal insert rings 142a, 142b. Here again a circular rod or wire 143 is threaded through the spring 124, and the inner end face of the seal ring is provided with the inserted wire 144. The inner portion 141b is bifurcated and forms a piston for urging portion 141a against the valve member.

The embodiment of FIGURE 15 employs a resilient seal ring 145 having retaining ribs 146 and 147. It will be noted that these ribs are located at different distances from the ends of the seal ring. The recesses 148 and 149, in which the ribs engage are correspondingly positioned. The purpose of this arrangement is to facilitate introduction of the seal into the body recess. It will be evident that as the seal ring is inserted into the body recess, the ring will be cocked or canted because of the displacement of the ribs, thus facilitating the use of harder and less compressable materials.

The seal ring 183 of FIGURE 16 is formed with a number of portions 183a, 183b, 183c, and 183d, which can be integrally joined together. Parts 183a, 183b and 183c can each be formed of a nylon rod or tube which is circular in section and flattened to facilitate joining together by cement. The part 183d can be semicircular in section, and is shown provided with a metal ring 185, which engages the wire spring 186. The spring can be substantially the same as shown in FIGURE 19. A snap-in retaining ring 187 forms a secure interlock between the outer periphery of the seal ring 183, and the body. The retaining ring 187 can be metal, but preferably is formed of nylon, or like relatively hard non-metallic material, and it can be cemented to the adjacent portions of ring 183, thus forming a rib. When the gate is in contact with the end surface 176, as on the downstream side of the valve, the ring 187 is seated upon the annular corner surface 188, thus forming a fluid tight seal between the ring 183 and the body.

The dimensions are such that the ring portions 183b, 183c, and 183d, are readily slidable with respect to the body, instead of being squeezed in a radial direction. Two additional spaced seal rings 189 are provided between the outer periphery of the seal ring and the bore 181, thus providing fluid tight seals. These seal rings can be formed of elastic material such as synthetic rubber, which is relatively softer than nylon, and during assembly the spaces between these seals may be filled with lubricating grease. A second retaining ring 190 is shown for anchoring the seal ring to the follower or carrier ring 184. A seal 191 is shown inserted between one end of the ring 184, and the shoulder surface 182. This serves to prevent dirt or other foreign material from entering the recess occupied by the seal ring 183.

The check valve illustrated in FIGURE 16 is somewhat different in construction from the corresponding valve shown in FIGURE 10. Briefly, line pressure from the body flow passage 178 is applied to the seal ring 183, through the connected ducts 192 and 193. Lubricating grease or other fluid under pressure can be applied through the pressure fitting 194, which is provided with the usual check valve 195. When lubricant under pressure is introduced, the ball 196 is forced outwardly to close duct 192, thus causing the lubricant to be forced through the duct 193. As previously mentioned in connection with FIGURE 20, this arrangement can also be used to apply pneumatic pressure to dislodge the sealing assembly, for making repairs.

Operation of the sealing assembly shown in FIGURE 16 is as follows: The follower ring 184 may move a limited amount to accommodate movements of the seal ring 183. Assuming use in a gate valve as illustrated, with application of line pressure and with the gate closed, on the upstream side there is some clearance between the surface 176 and the adjacent valve working surface of the gate 174. Line pressure is applied through ducts 192 and 193 to the sealing assembly, to press the portion 183a of the seal ring into sealing contact with the gate. The seal rings 188 and 189 prevent leakage between the seal ring 183 and the body. The fluid pressure area acted upon by the line pressure area is approximately the outer half of the axially projected area of the seal ring 183. On the downstream side of the valve the gate 174 is forced into abutting engagement with the hub surface 176, and the seal ring 183 is forced inwardly. The retainer ring 187 is urged into engagement with the surface 188, to form an additional seal with the body. The seal ring is relatively free to be forced inwardly or to project into contact with the gate on the upstream side, because of its slidable relationship with the valve body, and because of the action of the spring 181. Also the seal ring is not restrained against compression and relaxation within itself, because it has a fixed connection to the follower ring 184 only by virtue of the interlocking ring 190.

The arrangement shown in FIGURE 17 consists of a seal ring 196 formed of suitable material such as nylon, together with a follower or carrier ring 197. These parts are interlocked together by a rib 198 on the inner periphery of ring 196, which interfits a groove 199 in the outer periphery of the follower ring. The seal ring 196 also has an outer peripheral rib 201, which in the installation of the seal, is snapped into the groove 202. The seal rings 203 and 204 are of the resilient O-ring type, and provide seals between the ring 196 and the body. The metal ring 206 forms an abutting surface for engaging the coiled wire spring 207. In general the seal disclosed in FIGURE 17 functions in substantially the same manner as the seal of FIGURE 16. The follower ring 197 can be dimensioned to limit the compression of the seal ring 196. Also the annular surface 208 can be provided on the body for abutting the opposed surface of the rib 201, thus providing a limiting stop for the rib, and at the same time providing a seal between these parts on the downstream side. A seal ring 209 can be interposed between the body and one end of the follower ring 197, corresponding to the seal 191 of FIGURE 16.

In the arrangement shown in FIGURE 18, the seal ring and the follower or carrier ring are formed as one integral structure. Thus an annular member 211, made of suitable material such as nylon, or fiber glass reinforced Teflon, is machined to provide the curved portion 211a, which is adapted to contact and seal upon a gate or like valve member. An annular rib 212 snaps within the body recess 213, and serves to retain the assembly in place. The resilient seal rings 214 and 216 of the O-ring type, form sealing engagement between the member 211 and the body. The coil spring 217 yieldably urges the member 211 toward the cooperating valve member. Seal ring 218 prevents introduction of foreign material from the line into the recess 219. Line pressure on the upstream side is applied to the space 219, thereby urging the portion 211a into sealing engagement with the gate. Member 211 can be provided with a slit 220 which lends flexibility to portion 211a, and facilitates some bending of this portion for snapping the rib 212 into the recess 213.

FIGURE 19 illustrates one of my sealing assemblies applied to a valve of the ball type. A portion of a valve ball is illustrated at 211, and this ball is disposed within a housing which includes the annular wall portion 222. The annular portion 222 is machined to provide the bore 224 and the shoulder 225. The seal ring 226 is formed of suitable material like nylon, and has a portion 226a adapted to contact the valve working surface of the valve ball 221. A lip 222a can be provided to aid in retention of the seal ring. The retaining ring 227 can likewise be made of material like nylon, and is accommodated within the annular groove or recess 228. Ring 227 can be fixed to the portions 226a and 226b of the seal ring, as by means of a suitable cement. An additional seal ring 229, of the resilient O-ring type, is interposed between the outer periphery of the seal ring and the surface 224.

The seal ring 226 in FIGURE 19 surrounds the follower ring 231, and is anchored to the latter by the snap-in metal ring 232. A spring 233 formed of a coiled spring wire is interposed between the shoulder 225 and one end of the seal ring.

With the arrangement described above (FIGURE 19) the spring 233 urges the seal ring 226 against the spherical valve working surface of the valve ball 221. Assuming that the space occupied by the spring is exposed to line pressure in the body passage 223, then the seal ring acts as a piston and is urged by line pressure toward the valve ball.

This application is a continuation-in-part of Serial No. 149,619, filed November 2, 1961, and now abandoned.

I claim:

1. In a valve construction for controlling fluid flow wherein body and valve parts are relatively movable between open and closed positions and have cooperating valve working surfaces, one of said parts having an annular recess formed therein and defined by at least one cylindrical surface and a bottom surface, a seal ring formed of resilient material disposed within said recess and with one peripheral surface of the same adjacent said cylindrical surface, said ring being sealed with respect to said one part, one end face of said ring engaging the valve working surface of the other valve part to form a seal therewith, snap-in means acting between said cylindrical surface and said peripheral surface of the seal ring for retaining the seal ring within said recess without preventing operating movements of the same, and spring means disposed between the bottom surface and the seal ring for urging said seal ring toward said other part.

2. A valve construction as in claim 1 in which said snap-in means includes a rib formed on said peripheral surface of said seal ring, said one part having an annular shoulder to engage said rib, whereby said rib and said shoulder serve to retain the seal member within said recess while permitting movement of the seal member in a direction toward the bottom surface.

3. In a valve construction for controlling fluid flow wherein body and valve parts are relatively movable between open and closed positions and have cooperating valve working surfaces, one of said parts having an annular recess formed therein and defined by at least one cylindrical surface and a bottom surface, a seal ring formed of resilient material disposed within said recess and with one peripheral surface of the same adjacent said cylindrical surface, said ring being sealed with respect to said one part, one end face of said ring engaging the valve working surface of the other valve part to form a seal therewith, said seal ring presenting a fluid pressure area exposed to upstream line pressure to urge the same into sealing contact with said other part, and snap-in means acting between said cylindrical surface and said peripheral surface of the seal ring for retaining the seal ring within said recess without restraining operating movements of the same.

4. In a valve construction for controlling fluid flow, a body part having flow passages, a valve part disposed within the body part and movable between open and closed positions with respect to the flow passages, said parts having adjacent valve working surfaces surrounding said flow passages for closed position of the valve, said body having an annular recess which surrounds one of said flow passages, the recess being defined by at least one cylindrical surface and a bottom surface, a seal ring of resilient material disposed within said recess, said ring being sealed with respect to the body and having one portion thereof adapted to engage and seal with respect to the valve working surface of the valve part, snap-in means acting between said cylindrical surface and one periphery of the seal ring for retaining the seal ring within said recess without preventing operating movements of the same, and a follower or carrier ring, said seal ring and said follower or carrier ring having interfitting relationship, a portion of the seal ring being secured to said follower or carrier ring.

5. A valve construction as in claim 4 in which said snap-in means includes a rib fixed to said periphery of the seal ring, said body part having an annular shoulder normally adapted to abut said rib.

6. In a valve construction for controlling fluid flow, a body part having flow passages, a valve part disposed within the body part and movable between open and closed position with respect to the flow passages, said parts having adjacent valve working surfaces surrounding said flow passages for closed position of the valve, said body having an annular recess which surrounds one of said flow passages, the recess being defined by at least one cylindrical surface and a bottom surface, a seal ring of resilient material disposed within said recess, said ring being sealed with respect to the body and having one portion thereof adapted to engage and seal with respect to the valve working surface of the valve part, snap-in means acting between said cylindrical surface and one periphery of the seal ring for retaining the seal ring within said recess without preventing operative movements of the same, and spring means acting between said bottom surface and said seal ring for urging the seal ring toward said valve part.

7. In a valve construction for controlling fluid flow, a body part having flow passages, a valve part disposed within the body part and movable between open and closed positions with respect to the flow passages, said parts having adjacent valve working surfaces surrounding said flow passages for closed position of the valve, said body having an annular recess which surrounds one of said flow passages, the recess being defined by at least one cylindrical surface and a bottom surface, a seal ring of resilient material slidably fitted within said cylindrical surface, said seal ring being sealed with respect to the body and having one portion thereof adapted to engage and seal with respect to the valve working surface of the valve part, said seal ring presenting a fluid pressure area to line pressure in said body flow passage whereby line pressure acting upon said area urges said seal ring into engagement with the valve working surface of said valve part, and snap-in means acting between said cylindrical surface and one periphery of the seal ring for retaining the seal ring within said recess without preventing operating movements of the same.

8. A valve as in claim 7 in which an additional resilient seal ring forms the seal between the outer periphery of the first named seal ring and said cylindrical surface of the body.

References Cited in the file of this patent

UNITED STATES PATENTS

| | | | |
|---|---|---|---|
| Re. 20,574 | Martin | Dec. 7, | 1937 |
| 235,747 | Corliss | Dec. 21, | 1880 |
| 1,891,460 | Vlahek | Dec. 20, | 1932 |
| 2,366,520 | Griffith | Jan. 2, | 1945 |
| 2,631,577 | Carter | Mar. 17, | 1953 |
| 2,868,497 | Graham | Jan. 13, | 1959 |
| 2,919,886 | Hurst | Jan. 5, | 1960 |
| 3,006,599 | Eckert | Oct. 31, | 1961 |
| 3,011,757 | Miller | Dec. 5, | 1961 |
| 3,013,769 | Volpin | Dec. 19, | 1961 |
| 3,014,690 | Boteler | Dec. 26, | 1961 |
| 3,114,386 | Dumm | Dec. 17, | 1963 |